Figure 1:
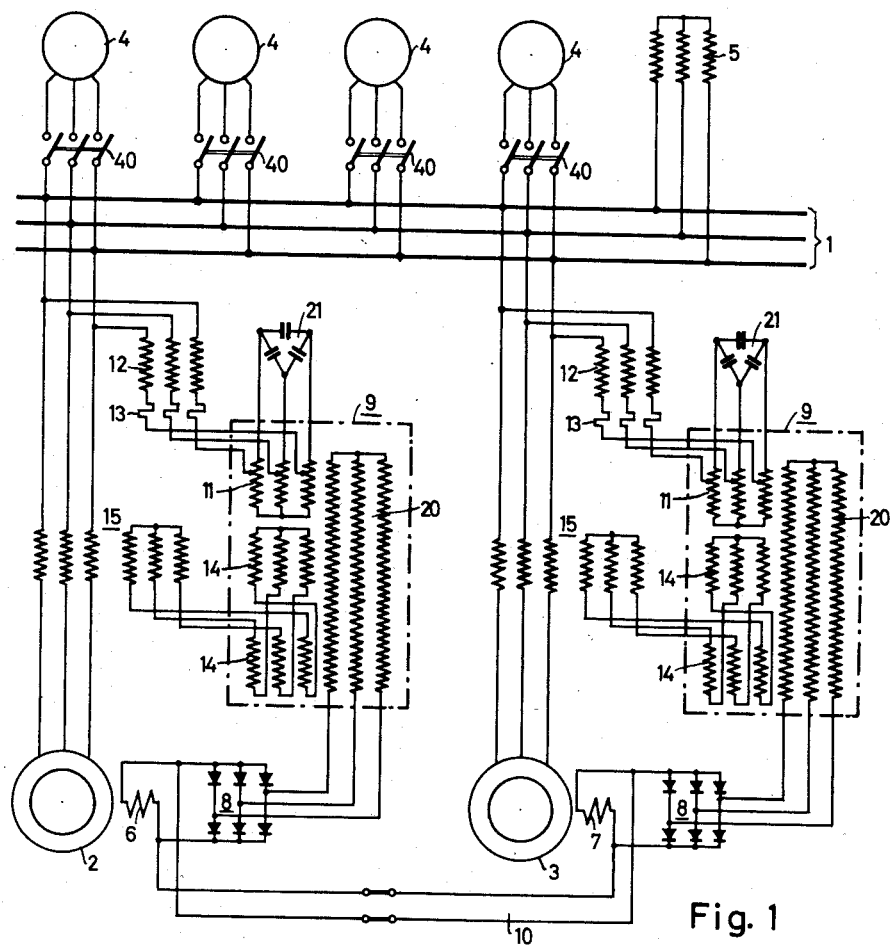

United States Patent Office 2,887,641
Patented May 19, 1959

2,887,641

ALTERNATING-CURRENT SYSTEMS WITH INTERMITTENTLY OPERATING SQUIRREL-CAGE MOTORS ENERGIZED FROM SYNCHRONOUS ALTERNATORS

Ernst Scharstein and Karlheinz Lutz, Nurnberg, and Hugo Falkenberg, Erlangen, Germany, assignors to Siemens-Schuckertwerke Aktiengesellschaft, Berlin-Siemensstadt and Erlangen, Germany, a corporation of Germany Application April 6, 1956, Serial No. 576,724

Claims priority, application Germany April 9, 1955

4 Claims. (Cl. 318—148)

Our invention relates to electric power distribution systems for the operation of intermittently operating squirrel-cage motors energized from synchronous alternators and, in a more particular aspect, to three-phase systems aboard ship where the load imposed upon the synchronous alternators involves multi-speed winch motors whose intermittent operation and speed-switching impose severe requirements upon the alternators.

The switching of motors with short-circuited rotors, such as motors of the squirred-cage type, demands a large amount of wattless power. If such motors are switched frequently in intermittent operation and are energized from synchronous alternators, then the wattless load currents are extremely detrimental to the voltage stability of the alternators. This has been an obstacle to using three-phase alternating current for power distribution aboard ship in lieu of the heretofore conventional direct current, notwithstanding the fact that direct-current installations are more costly and, because of their need for continuous maintenance of commutators, are unfavorable for rough ship-board requirements. From this viewpoint, all known regulators for maintaining constant alternator voltage leave much to be desired. They fail to operate fast enough, and are not so rugged as to operate satisfactorily during vibrations, shocks and inclined positions as are inevitable aboard ship. Consequently, the alternators, called upon to deliver the required wattage as well as the wattless power for the motors, must be given such a large and overdimensioned rating, relative to the power demand of the largest three-phase motor to be operated, that the surges of wattless load have virtually no effect upon the voltage stability. Such overdimensioned alternators, however, greatly increase the cost of the system. Resort has therefore been taken to the provision of motor-generator converters, but this again requires direct-current machinery with the above-mentioned inherent disadvantages.

It is an object of our invention to eliminate these difficulties and to provide an alternating-current system, suitable for installation aboard ship, which permits the operation of squirrel-cage motors from synchronous alternators of normal rating and size without appreciable detriment to voltage stability.

To this end, and in accordance with a feature of our invention, we provide the alternating current system, particularly aboard ship, with one or more pole-switchable squirrel-cage motors of drooping torque characteristic, and we energize the motors from one or more synchronous alternators having load-dependent field excitation supplied through rectifiers and controlled in response to current and voltage so as to form the geometric sum of a component proportional to the alternator load current and a component proportional to the alternator voltage.

The starting and pole-switching currents of the motors are kept as small as possible. Due to the load-responsive excitation of the synchronous alternators feeding the motors, the wattless currents of the motors have the effect of increasing the alternator excitation during switching surges thus counteracting the otherwise existing tendency of voltage reduction. This contributes to maintaining the bus voltage always at a constant value. Very favorable in this respect is the shortness of the time interval, amounting to only a few cycle periods, within which the inevitable voltage fluctuations caused by stray phenomena in the alternator, are compensated at the switching moment. As a result, the alternators need no longer be overdimensioned.

In order to reduce the dependence of the voltage upon the power factor, which with large overloads may cause voltage departures of several percent from the normal value, it is preferable to make the phase displacement angle $\varphi$ between current and voltage different from, particularly smaller than, the normal phase angle of $90°+\varphi$ between no-load ampere windings and load-ampere windings, the departure being dependent upon the particular requirements of the system.

The drawing shows an embodiment of the invention by way of example.

Figure 2:
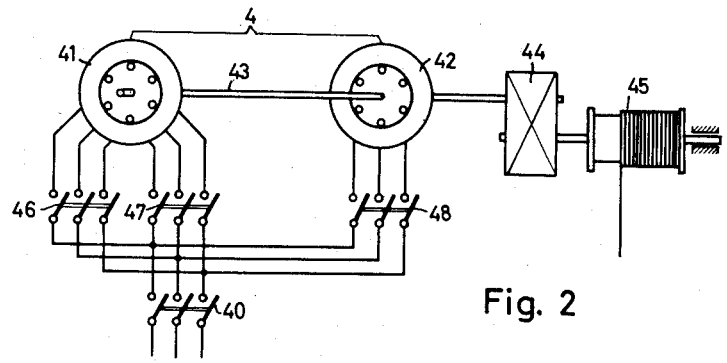
Figure 3:
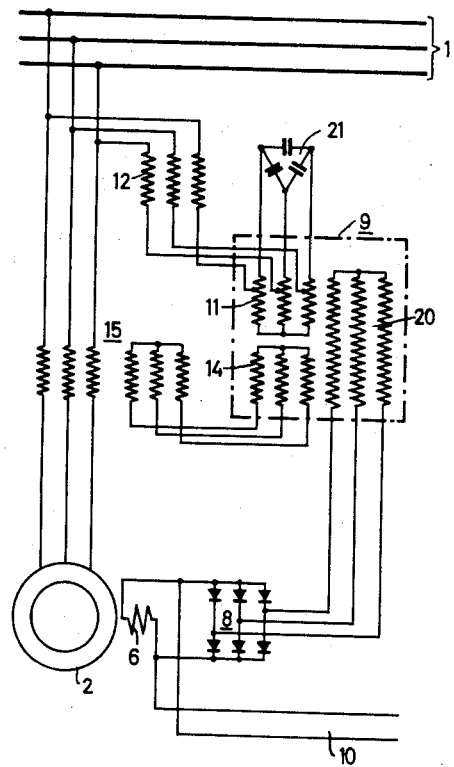
Figure 4:
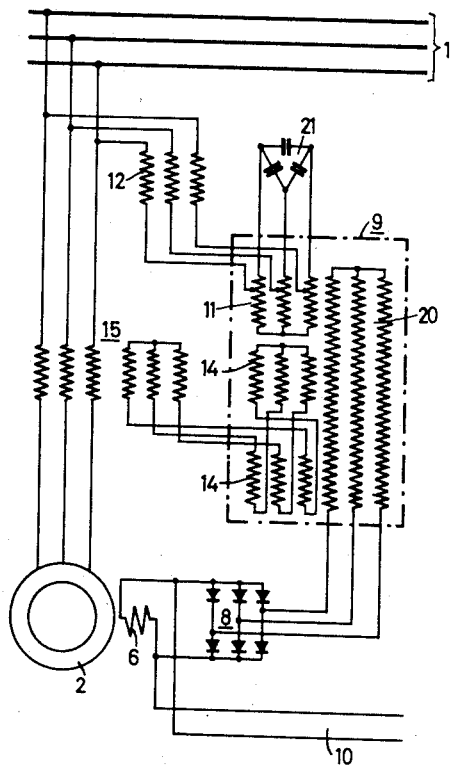

Fig. 1 is a schematic circuit diagram of a power system aboard ship. Fig. 2 shows schematically one of the cargo-winch drives appertaining to the system. Figs. 3 and 4 show schematic diagrams of two respective modifications of the system.

The three-phase distribution bus 1 of the system is energized from synchronous alternators 2 and 3. Connected to the bus by respective switches 40 are the pole-switchable drive motors 4 of respective cargo winches as well as any other loads such as the load indicated at 5. Each winch-drive motor 4 has a short-circuited or squirrel-cage armature. The field system of each motor comprises respectively different numbers of poles which are selectively energized in order to make the motor run at any one of the available different synchronous speeds. To this end, each motor is preferably designed as a twin motor as separately illustrated in Fig. 2.

Each twin motor has two dynamoelectric components whose respective rotors are mounted on a common shaft 43 which is shown to drive a winch drum 45 through a reduction gear 44. The field 41 of one component motor is wound for four and eight poles respectively. The second component 42 of motor 4 is wound for thirty-two poles. When the motor is energized through switch 40, the selective actuation of one of three switches 46, 47, 48 permits operating at any one of three available speeds. When switch 46 is closed, the four-pole field of component motor 41 is in operation to run the winch at maximum speed. When switch 47 is closed, the component motor 41 is operated with eight poles to run the winch at medium speed. When switch 48 is closed, the component motor 42 is in operation with thirty-two poles to run the drive at minimum speed. Consequently the motor involves a pole ratio of 1:2:8. As mentioned above, large amounts of wattless current are drawn when the motor is started and also when, during winch operation, the motor is switched from one to another operating speed. Such squirrel-cage multi-speed motors have a drooping torque characteristic.

As shown in Fig. 1, the field excitation windings 6 and 7 of the respective alternators 2 and 3 are each energized through a rectifier 8 from the secondary winding 20 of a current transformer 9. The two field windings 6 and 7 are connected in parallel by leads 10. The parallel connection can be interrupted by means of a switch 19 when only one of the alternators is in operation at a time.

Each current transformer 9 is energized by two groups 11 and 14 of primary windings. The primary windings 11 are connected to the bus voltage through reactors 12 and ohmic resistors 13 in order to supply a component field excitation which is independent of the load imposed upon the alternator. The primary windings 11 may be connected with further reactive impedances such as the capacitors 21 for power factor control.

The primary windings 14 are composed of two parts which are connected in series with the stator windings of the alternator through an intermediate transformer 15. Thus the primary windings 14 are energized from the load current of the synchronous machine. In each current transformer 9, therefore, the output of secondary winding 20 represents the geometric sum of a component proportional to the alternator load current and a component proportional to the line voltage. This geometric-sum output is rectified by the rectifier 8 and supplied to the field excitation winding 6 or 7 of the alternator.

When operating with a variable power factor (cos $\varphi$), the voltage of the synchronous alternators can be kept constant by correspondingly dimensioning and combining imaginary and real impedances as is exemplified by the combination of impedances 12, 13 and 21 in Fig. 1. As a result, it can be made certain, for instance, that the load-dependent ampere windings of alternator excitation lag the terminal voltage by more or less than 90°. The most favorable phase angle between no-load ampere windings and load ampere windings of excitation can also be obtained by other means applicably used singly or in combination with each other. Such means, for instance, are the use of the voltage from another phase or of an inter-phase voltage for producing the no-load excitation components on the alternating-current side of the excitation circuit as is shown in Fig. 3; or the use of a zigzag connection for the no-load component or the load component to be geometrically added in the current transformer as is shown in Fig. 4. When operating with a plurality of alternators, as shown in Fig. 1, a satisfactory parallel operation of the synchronous machines is secured by connecting the excitation circuits in parallel, either on the direct current side as shown, or on the alternating current side.

We claim:

1. A three-phase alternating-current drive system for intermittent driving operation, comprising a plurality of pole-switchable plural-speed induction motors of the squirrel-cage type having a drooping torque characteristic, a three-phase bus, switch means selectively connecting said respective motors to said bus, a plurality of synchronous alternators having respective three-phase load circuits connected with said bus in parallel to each other; each of said alternators having a direct-current excitation winding, current-responsive means connected to said load circuit, voltage-responsive means connected across said load circuit, a current transformer device having respective primary windings connected with said current-responsive means and said voltage-responsive means respectively, said transformer device having a secondary winding whose output current corresponds to the geometric sum of a component proportional to the alternator load current and a component proportional to the alternator terminal voltage, and rectifier means connecting said secondary winding with said excitation winding for supplying it with load-dependent excitation current, said respective rectifier means being electrically connected in parallel with each other, whereby reactive power surges due to pole switching of said motors cause said excitation windings to receive increased excitation through said rectifier means for counteracting bus voltage fluctuations.

2. A ship-board power system for three-phase alternating current, comprising a plurality of winch drive motors of the squirrel-cage type, each motor having a plurality of selectively operable pole numbers to run at different synchronous speeds respectively, and each motor having selector switch means for setting the motor speed, a three-phase bus, switch means selectively connecting said respective motors to said bus, a plurality of synchronous alternators having respective three-phase load circuits connected with said bus in parallel to each other; each of said alternators having a direct-current excitation winding, current-responsive means connected to said load circuit, voltage-responsive means connected across said load circuit, a current transformer device having respective primary windings connected with said current-responsive means and said voltage-responsive means respectively, said transformer device having a secondary winding whose output current corresponds to the geometric sum of a component proportional to the alternator load current and a component proportional to the alternator terminal voltage, and rectifier means connecting said secondary winding with said excitation winding for supplying it with load-dependent excitation current, whereby reactive power surges due to pole switching of said motors cause said excitation windings to receive increased excitation through said rectifier means for counteracting bus voltage fluctuations.

3. An alternating-current system according to claim 1, comprising phase-shift means connected with one of said current-responsive means and voltage-responsive means respectively for securing a given phase angle between said two excitation components.

4. An alternating-current system according to claim 1, comprising a combination of ohmic and reactive impedances connected with one of said respective current-responsive means and voltage-responsive means for securing a given phase angle between said two excitation components.

References Cited in the file of this patent

UNITED STATES PATENTS

| 1,847,585 | Ytterberg | Mar. 1, 1932 |
| 2,419,268 | Lewis | Apr. 22, 1947 |
| 2,576,647 | Sikorra | Nov. 27, 1951 |
| 2,608,679 | Witzke | Aug. 26, 1952 |
| 2,769,133 | Franklin | Oct. 30, 1956 |
| 2,783,432 | Harz | Feb. 26, 1957 |
| 2,806,990 | Evans | Sept. 17, 1957 |

FOREIGN PATENTS

| 13,099 | Great Britain | May 31, 1911 |
| 834,163 | France | Aug. 8, 1938 |